(12) United States Patent
Regensburger et al.

(10) Patent No.: US 11,550,138 B2
(45) Date of Patent: Jan. 10, 2023

(54) MICROSCOPY METHOD AND MICROSCOPE FOR PRODUCING AN IMAGE OF AN OBJECT

(71) Applicant: Carl Zeiss Meditec AG, Jena (DE)

(72) Inventors: Alois Regensburger, Poxdorf (DE); Christoph Nieten, Jena (DE); Artur Hoegele, Oberkochen (DE); Christoph Hauger, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 34 days.

(21) Appl. No.: 17/158,941

(22) Filed: Jan. 26, 2021

(65) Prior Publication Data

US 2021/0231941 A1    Jul. 29, 2021

(30) Foreign Application Priority Data

Jan. 27, 2020 (DE) .................... 10 2020 101 880.0

(51) Int. Cl.
*G02B 21/36* (2006.01)
*G02B 21/06* (2006.01)
(Continued)

(52) U.S. Cl.
CPC ....... *G02B 21/365* (2013.01); *G02B 21/0012* (2013.01); *G02B 21/06* (2013.01); *H04N 5/2256* (2013.01); *H04N 5/23296* (2013.01)

(58) Field of Classification Search
CPC .. G02B 21/365; G02B 21/0012; G02B 21/06; H04N 5/2256; H04N 5/23296
See application file for complete search history.

(56) References Cited

U.S. PATENT DOCUMENTS

| 8,345,090 B2 | 1/2013 | Watanabe et al. |
| 9,245,317 B2 | 1/2016 | Abnet et al. |

(Continued)

FOREIGN PATENT DOCUMENTS

| DE | 10335644 B3 | 12/2005 |
| DE | 10 2006 009 452 A1 | 4/2007 |

(Continued)

OTHER PUBLICATIONS

Leica M720 OH5 brochure, "A Paradigm Shift in Vision, Comfort, and Flexibility Premium Surgical Microscope for Microsurgery, Unsurpassed Patient Safety", p. 9 of 24, copyright Leica Microsystems (Schweiz) AG, 2013.

(Continued)

*Primary Examiner* — James T Boylan
(74) *Attorney, Agent, or Firm* — Walter Ottesen, P.A.

(57) ABSTRACT

A microscopy method is for producing an electronic image of an object, wherein the object is imaged with an adjustable optical imaging scale on an image detector. The method includes: selecting a parameter for the electronic image, wherein the parameter can be influenced by the optical imaging scale and differs from the image field dimensions, and setting a setpoint value range for the parameter, setting a total imaging scale for the electronic image, wherein adjusting or controlling the parameter of the electronic image is implemented such that, at the same time, the parameter of the electronic image lies in the specified setpoint value range with a tolerance and the set total imaging scale is obtained, wherein the optical imaging scale forms a basis for a manipulated variable of the adjustment or closed-loop control and a digital image magnification is carried out on the basis of the set total imaging scale.

18 Claims, 3 Drawing Sheets

(51) Int. Cl.
*H04N 5/225* (2006.01)
*H04N 5/232* (2006.01)
*G02B 21/00* (2006.01)

(56) References Cited

U.S. PATENT DOCUMENTS

| | | |
|---|---|---|
| 10,139,613 B2 | 11/2018 | Hing et al. |
| 2005/0063047 A1 | 3/2005 | Obrebski et al. |
| 2006/0092505 A1 | 5/2006 | Abnet et al. |
| 2008/0198448 A1 | 8/2008 | Ganser et al. |
| 2008/0266657 A1 | 10/2008 | Strahle et al. |
| 2012/0002274 A1* | 1/2012 | Knoblich ............ G02B 21/24 359/380 |
| 2012/0099004 A1* | 4/2012 | Shibuno ............ H04N 5/23209 348/E5.051 |
| 2013/0064531 A1* | 3/2013 | Pillman ............ H04N 5/2256 396/62 |
| 2014/0071263 A1* | 3/2014 | Laguarta Bertran ............ G02B 21/0016 348/79 |
| 2015/0070484 A1* | 3/2015 | Kajitani ............ G02B 21/361 348/79 |
| 2019/0141251 A1* | 5/2019 | Ardo ............ H04N 5/2353 |
| 2019/0339502 A1 | 11/2019 | Regensburger et al. |
| 2019/0339506 A1 | 11/2019 | Regensburger et al. |

FOREIGN PATENT DOCUMENTS

| | | |
|---|---|---|
| DE | 20 2005 021 436 U1 | 2/2008 |
| DE | 10 2007 007 797 A1 | 8/2008 |
| DE | 10 2009 012 707 A1 | 9/2010 |
| DE | 10 2018 110 643 B3 | 7/2019 |

OTHER PUBLICATIONS

Nikon Imaging Asia Pacific Gateway, "Optical vs Digital Zoom", Article ID 000026267, published Dec. 21, 2016, pp. 1 and 2.

* cited by examiner

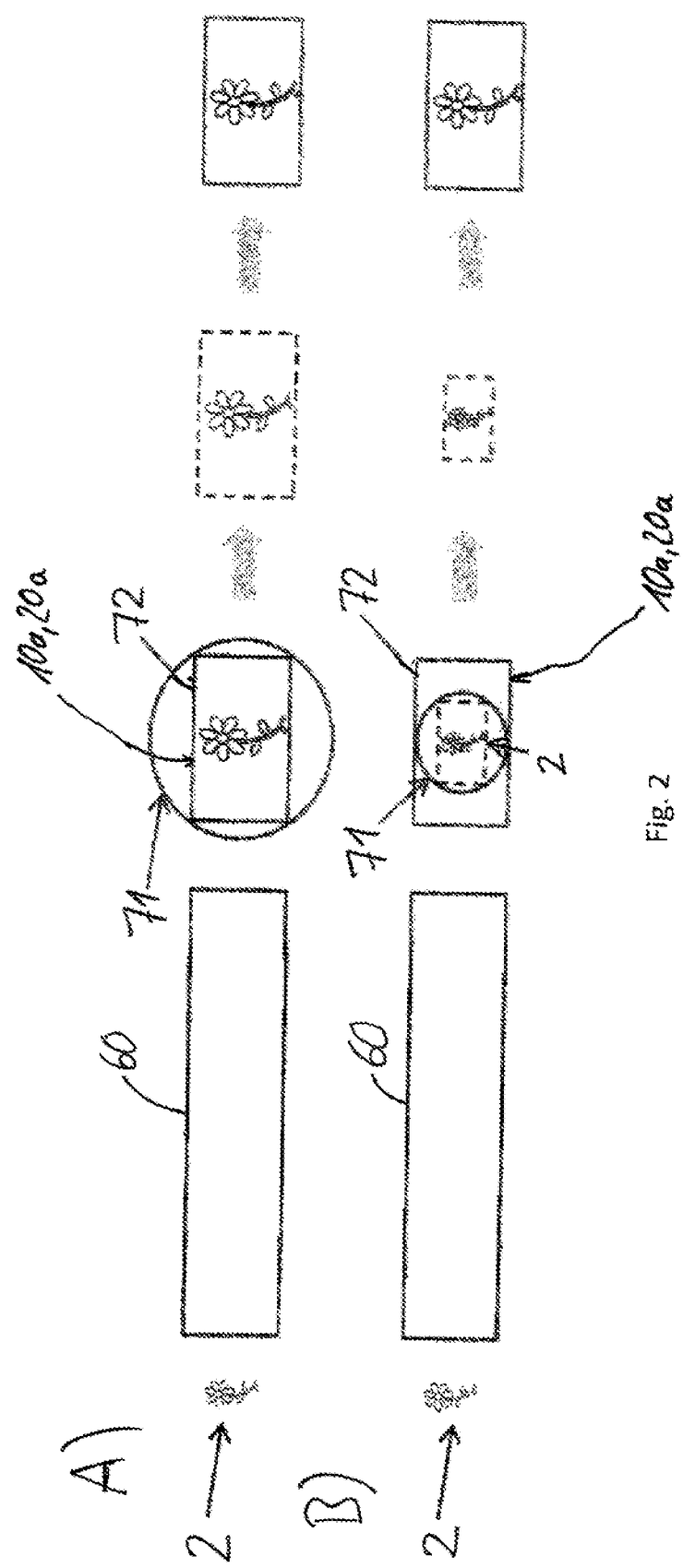

MICROSCOPY METHOD AND MICROSCOPE FOR PRODUCING AN IMAGE OF AN OBJECT

CROSS REFERENCE TO RELATED APPLICATION

This application claims priority of German patent application no. 10 2020 101 880.0, filed Jan. 27, 2020, the entire content of which is incorporated herein by reference.

FIELD OF THE INVENTION

The disclosure relates to a microscopy method and a microscope for producing an electronic image of an object, wherein the object is imaged with an adjustable optical imaging scale on an image detector.

BACKGROUND OF THE INVENTION

Surgical microscopes are known from US 2008/0266657 A1 or US 2005/0063047 A1. Further, digital surgical microscopes which include a digital magnification (often called zoom) combined with optical image magnification are known, by way of example, from US 2006/0092505 A1, US 2012/0002274 A1, U.S. Pat. No. 10,139,613 B2 or US 2008/0198448 A1.

In microscopes which generate electronic images at adjustable optical magnification, usually the maximum optical magnification is utilized and additional zooming is performed with the aid of a digital magnification. The total magnification is the product of the optical magnification scale multiplied by the digital zoom factor. However, all image information is contained in the optical image and digital magnification does not provide additional image information. In particular, no increased light sensitivity is achieved by digital zooming.

US 2019/0339506 A1 discloses a digital surgical microscope which is adjusted such that no details for which image information would be available but which cannot be recognized due to his eyesight and due to the distance at which he is standing are displayed on a display device.

SUMMARY OF THE INVENTION

It is an object of the invention to provide a microscopy method and a microscope, via which it is possible to produce an improved image of an object.

The aforementioned object can, for example, be achieved by a microscopy method for producing an electronic image of an object. The method includes: setting a total imaging scale for the electronic image; providing a specified parameter for the electronic image, wherein the specified parameter includes at least one of the following: a signal-to-noise ratio in the electronic image, a depth of field range, a working distance being a distance between the microscope and the object, and an object illumination intensity; specifying a setpoint value range for the specified parameter; illuminating and imaging the object with an adjustable optical imaging scale onto an electronic image detector providing electronic image data while open-loop or closed-loop controlling the specified parameter to have a value in the specified setpoint value range with a tolerance, wherein at least the optical imaging scale forms a basis for a manipulated variable of the open-loop or closed-loop control; and, generating the electronic image by performing digital image magnification on the electronic image data to the total imaging scale.

The object can, for example, further be achieved by a microscope for producing an electronic image of an object. The microscope includes: an image detector configured to generate electronic image data; an objective lens, a tube lens and an adjustable optical zoom lens configured to conjointly produce an optical image on the image detector with an adjustable optical imaging scale; a control device including a processor and being configured to produce an electronic image of the object from the electronic image data and to adjust the adjustable optical imaging scale; the control device being further configured to: set a total imaging scale for the electronic image, provide at least one specified parameter for the electronic image, wherein the specified parameter includes at least one of: a signal-to-noise ratio in the electronic image, a depth of field range, a working distance being a distance between the microscope and the object, and an object illumination intensity, specify a setpoint value range for the specified parameter, illuminate and image the object with the adjustable optical imaging scale onto the electronic image detector while open-loop or closed-loop controlling the specified parameter to have a value in the specified setpoint value range with a tolerance, wherein at least the optical imaging scale forms a basis for a manipulated variable of the open-loop or closed-loop control, and generate the electronic image by performing digital image magnification on the electronic image data to the total imaging scale.

The microscopy method produces an electronic image of the object. The object is imaged from an object field with an adjustable optical imaging scale onto an image field of an image detector and an electronic image of the object is produced. Preferably, the optical imaging scale is continuously variable within certain boundaries. At least one specified parameter which is able to be influenced by the optical imaging scale is provided. The range of parameters which can be the specified parameter includes: the signal-to-noise ratio of regions illuminated on the image detector, the depth of field of the imaging, the illumination intensity, working distance.

A setpoint value range is specified for the parameter. Further, a total imaging scale, which is desired for the electronic image, is set. It depends on the optical imaging scale and on an adjustable digital image magnification being a digital zoom. Now, the optical imaging scale is used as manipulated variable in an open-loop or closed-loop control of the parameter to the specified setpoint value range (with a possible tolerance of up to 10% or 20%, for example). The digital image magnification is adapted accordingly to ensure that the set total imaging scale is obtained. The control ensures that a deviation of the value of the parameter from the specified setpoint value range is below a tolerance deviation, which optionally equals zero; that is, the parameter lies in the specified setpoint value range.

The parameter is controlled by, for example, adjusting a fraction of the optical imaging scale in the total imaging scale. Hence, the fraction of the optical imaging scale in the total imaging scale is the manipulated variable. In this context, it is irrelevant whether the absolute value of the optical imaging scale is used and the digital magnification then is selected such that the absolute value of the optical imaging scale together with the digital magnification yields the total imaging scale or whether a relative proportion of the optical imaging scale is used directly as a manipulated variable, or whether a ratio between optical imaging scale and the digital magnification is used. What is decisive in all cases is that the optical imaging scale is set without taking account of the total imaging scale to control the parameter. The digital magnification is employed to ensure that the combination of optical imaging scale and digital magnification realizes the set total imaging scale.

In embodiments, the optical imaging scale forms the basis for the manipulated variable by using as the manipulated variable an absolute value of the optical imaging scale, a proportion of the optical imaging scale in the total imaging scale or a ratio of optical imaging scale to the digital magnification.

The control device includes an electronic data processor. In embodiments, the control is realized as proportional (P) closed-loop control, proportional integral (PI) closed-loop control, proportional integral derivative (PID) closed-loop control or fuzzy control. In embodiments, the control device of the microscope contains a corresponding controller, which can be embodied as a hardware solution or as a software solution or as a mixture from these.

The optical imaging scale may either have a direct or indirect effect on the parameter, that is, an increase in the optical imaging scale may either increase or reduce the value of the parameter. This property is taken into account in controlling the parameter. In many cases there is an indirect relationship since, for example, the signal-to-noise ratio or the depth of field increase with a reduction of the optical imaging scale.

The method distributes the total magnification between optical magnification and digital image magnification for optimizing the parameter that is able to be influenced by the optical imaging scale. The parameter is controlled in such a way that it is in the specified setpoint value range or misses the latter by no more than the tolerance. In the control, the total image scale is no longer obtained exclusively by optical means, even if this is possible in theory. Rather, a fraction of the total image scale (that is, magnification) is realized by the digital magnification. This gives room to optimize the parameter such that it lies in the set setpoint value range or misses it by no more than the tolerance.

In embodiments, the term tolerance relates to a deviation from the upper or lower limit of the setpoint range. Hence, it sets an additional tolerance range by which the value can lie above the upper limit or below the lower limit of the setpoint value range. The percentage is related to the respective limit of the setpoint value range.

In embodiments, the control can be implemented continuously, in particular if the optical imaging scale is continuously variable. In embodiments, a preliminary electronic image is produced first, within which the total imaging scale is entirely realized by the optical imaging scale. Subsequently, the value of the parameter is determined for the preliminary electronic image and a check is carried out as to whether it lies in the specified setpoint value range. If not, a distribution of the total imaging scale between the optical imaging scale and the digital image magnification is established directly or in iterations in order to bring the parameter into the specified setpoint value range (or miss the latter by no more than the tolerance).

The term "imaging scale" is understood here within the conventional sense of microscopy; that is, it relates to magnification or de-magnification of the object in the electronic image. In most cases, a magnification is used. The optical imaging scale is the imaging scale effected by the imaging beam path and the optical elements of the microscope. Preferably, an object field with fixed dimensions is imaged on an image field with variable dimensions and this defines the optical imaging scale. Digital magnification is an additional magnification which is only implemented on the basis of the digital image data, that is, without involvement or adjustment of optical elements.

The microscope used for the microscopy method is in embodiments a surgical microscope. Preferably, the surgical microscope is a stereo surgical microscope. The stereo microscope is a digital microscope which, by way of the stereo beam paths, displays a stereo image not in an eyepiece but on an electronic display.

The disclosure also provides a microscope for producing an image of an object, wherein the microscope includes a digital detection device, a zoom optical unit and a control device. The detection device produces a digital image of the object from an image representation of the object. The zoom optical unit images the object on the detection device with an adjustable optical imaging scale. The control device is connected to the detection device for the purpose of producing the image and is configured to adjust the optical imaging scale of the zoom optical unit. In particular, the control device is configured to carry out one of the methods disclosed in this specification.

To adjust the optical imaging scale, use is preferably made of a zoom optical unit which includes a zoom objective or a zoom lens system.

In embodiments, the object is a body that should be observed by means of the stereo microscope, for example a human or animal body or a part thereof.

The control device can be, for example, a microprocessor, a computer having a correspondingly configured computer program, or any other electric circuit. The control device produces a digital image from the electrical signals.

The microscope can further include an electronic display, on which the electronic image can be displayed.

The control device is configured to adjust the optical imaging scale, for example, an imaging scale of a zoom optical unit. To this end, the control device is suitably connected to the zoom optical unit, for example, by means of electrical lines or by radio. By way of example, the control device controls a drive which shifts a position of lenses in a zoom optical unit in relation to one another.

In embodiments, the control device includes an input device, for example, to input the total imaging scale and/or the parameter and/or setpoint value thereof and/or the tolerance. The total imaging scale can be set by the user of the microscope, who specifies the total imaging scale, that is the desired magnification with which the object shall be observed. This can be realized in a specification step, in which the user sets the optical imaging scale to a desired imaging scale. The control device thus concludes that this scale is the desired total imaging scale.

The parameter that is able to be influenced by the optical imaging scale is a parameter which is adjustable when the image is produced and which depends on the optical imaging scale. Properties of the image, for instance number of pixels of a detector, dimensions, exposure time or frame rate, which cannot be influenced by the optical imaging scale, should not be considered within the scope of this application as parameters that are able to be influenced by the optical imaging scale. The image field dimensions should not be considered such a parameter either.

By reducing the optical imaging scale, the radiation originating from the object is imaged on fewer pixels of the image detector than in the case where a larger optical imaging scale is chosen. In the case of a larger imaging scale, an object field is imaged on more pixels of the image detector, and so less intensity of the imaging radiation is available for each individual pixel. Therefore, it is preferable for the parameter to include a signal-to-noise ratio of the electronic image and/or a depth of field range of the electronic image. In this way, the light intensity on the image detector can be increased by reducing the optical imaging scale and hence it is possible to improve the signal-to-noise ratio of the electronic image. The depth of field of an image reduces when the imaging scale is increased. Consequently, it is also possible to improve the depth of field of the electronic image by reducing the optical imaging scale. As an alternative or in addition, it is possible to adapt, for example reduce, an illumination intensity or a working distance.

When controlling the parameter, a check is carried out, for example in the aforementioned preliminary image, as to whether the value of the parameter lies within the specified setpoint value range. By way of example, the specified setpoint value range can be a range above or below a certain limit value. However, it is also possible for the range to be limited on both sides. The specified setpoint value range is set, in particular, in view of an image quality. By way of example, in the case of a total imaging scale realized purely in optical fashion, it is determined that the signal-to-noise ratio of the image is too low and consequently does not lie in the desired setpoint value range or lies above the admissible tolerance deviation. Alternatively, the depth of field range may be determined as not lying within the desired setpoint value range after the total imaging scale has been set. Then, the optical imaging scale is reduced after a specified period of time within the scope of the closed-loop control until the value of the parameter lies within the specified setpoint value range. A final image is generated subsequent thereto.

If a reduction of the optical imaging scale does not bring the parameter into the setpoint value range, the method is optionally terminated. By way of example, it is possible for the optical imaging scale to reach a predetermined minimum imaging scale without the value of the selected parameter lying in the specified setpoint value range (possibly with the tolerance being taken into account). In this case, the method is terminated. The method is preferably also terminated if the value of the parameter moves away from the specified setpoint value range while the optical imaging scale of the zoom optical unit is reduced. Alternatively, it is possible to adapt the tolerance which represents a maximum admissible deviation from the setpoint value range.

When the optical imaging scale is reduced, digital magnification is usually increased in relation to a minimum magnification which may be zero. To the extent that a reduction of the optical imaging scale is referred to below, this is nevertheless only by way of example since there might also be cases where the optical imaging scale needs to be increased, for example because the working distance is increased at the same time (as will be explained in more detail below). Accordingly, the aspects mentioned below on the basis of a reduction of the optical imaging scale also apply analogously to an increase of the optical imaging scale.

In embodiments, the microscopy method is implemented automatically. This does not preclude the user from setting the total imaging scale and/or the image detail on the object (indirect specification of the total imaging scale) and selecting the parameter. In embodiments, the control device automatically checks the value of the parameter and reduces the optical imaging scale (while compensating for that by increased digital zoom) until the value of the parameter lies in the specified setpoint value range. In embodiments, the optical imaging scale and the digital magnification are altered so quickly that it is not apparent to the observer of the final image.

An advantage of the microscopy method is that parameters of the image of the object, such as the signal-to-noise ratio, depth of field range and/or illumination intensity, can be improved without the user having to manually undertake optimization. Moreover, the desired total imaging scale, that is, also the same image detail of the object, is displayed to the observer and so the latter only notices improvement in the selected parameter.

In embodiments, the optical imaging scale is not reduced to such an extent that the resolution of the final image following the digital magnification still lies below a specified minimum resolution. The specified minimum resolution is linked with, for example, a lower limit for the optical imaging scale such that the specified minimum resolution limits reduction of the optical imaging scale. The digital magnification reduces the resolution. To restrict this, the specified minimum resolution can be entered manually or a value is set for a specific microscope, an undershoot of the value leading to the expectation that the resolution visible in the image would be too low.

The working distance is the distance between the object and a lens of the microscope, generally the objective, which is closest to the object. The region of the object visible in the image changes by the increase in the working distance. What can be achieved by digital magnification is that the visible region of the object in the image remains the same, despite the altered working distance. Increasing the working distance is helpful, particularly in the case of surgical microscopes, since it is often sought after in the case to set the working distance as large as possible in order to have as much space as possible between the microscope and the object for operation activities. It is therefore preferable for the working distance to be altered when the optical imaging scale is altered.

By way of example, the microscope can be provided with a stand or any other support device, which is able to adjust the working distance. In particular, the microscope is provided with a distance sensor such that the working distance is known. Altering the working distance can be combined with altering the optical imaging scale by a zoom optical unit, either in the same sense or in the opposite sense; by way of example, by increasing the working distance and subsequently carrying out digital magnification, the displayed image can still have a resolution or perceivable resolution that lies above the specified limit value. Moreover, it is possible to select a mode of operation in which the working distance should be maximal. To this end, it is possible to make a compromise in respect of the parameter of the image by virtue of, for example, altering the specified setpoint value range. By way of example, it is possible to reduce the requirements in respect of the signal-to-noise ratio and the depth of field range and hence alter the specified setpoint value range and, at the same time, make the working distance as large as possible. A consequence of this is that, for example, a reduction of the optical imaging scale caused by optical elements is less pronounced. As a result, the resolution prevalent in the image is better, and so there is a greater buffer for increasing the working distance and the digital magnification while, at the same time, the specified limit value for the resolution is maintained. Alternatively, the image resolution can be reduced for the purpose of increasing the working distance, and so more space is available for the digital magnification after an increase in the working distance.

In embodiments, the illuminance on the object is reduced at the same time as there is a reduction in the optical imaging scale. As explained above, reducing the imaging scale leads to an increase in the intensity of the radiation per pixel originating from the object. Consequently, the signal-to-noise ratio can be maintained in the case of a low illuminance. Radiation intensities on the object, which can lead to radiation damage or to overheating or desiccation of the object as a result of the radiation, can thus be avoided. Therefore, an illuminance of the illumination of the object is preferably altered. The intensity of the illumination radiation on the object can likewise be a parameter that can be taken into account when the image is being produced. By way of example, this allows intensity of the radiation on the object to be reduced, for example under a specified limit value. This is implemented by reducing the optical magnification scale with a subsequent digital magnification to the total magnification scale. In this case, it is not the signal-to-noise ratio parameter that can be improved, but the radiation intensity on the object parameter.

The image field is, in the conventional technical sense, the area corresponding to the imaged object field in the image plane. If the image field is greater than the detector area, not all of the radiation originating from the object field is incident on the detector area and the image brightness is reduced. If the optical imaging scale is chosen in such a way that the image field lies completely within the detector area of the image detector, all incident light is detected, as a result of which the signal-to-noise ratio is at an optimum. Consequently, in order to improve the signal-to-noise ratio, provision is made for the optical imaging scale to be adjusted in such a way that the image field lies within the detector area. The closed-loop control can orient itself on the basis of, for example, dark regions at the edge of the image detector in order ultimately to optimize the signal-to-noise ratio of the image.

Naturally, the microscopy method is not fixed to adjusting or controlling a single parameter. Rather, use can also be made of a combination of two or more parameters, each of which has assigned an individual setpoint value range and tolerance deviation. Here, it is preferable for the resolution present in the image, signal-to-noise ratio, depth of field range, working distance and/or illuminance to be adjusted together in respect of optimal values. By way of example, a common change is implemented to the effect of the individual parameters of the image representation lying in the respective setpoint value range. In the process, a cost function KF is preferably evaluated and minimized, as is represented in exemplary fashion in the following equation for the resolution, the depth of field range and the illuminance:

$$KF(Z,V)^2 = W1*((\text{resolution}(Z,V) - \text{limit}_{resolution})/\text{limit}_{resolution})^2 + W2*((\text{depth of field range}(Z,V) - \text{limit}_{depth\ of\ field\ range})/\text{limit}_{depth\ of\ field\ range})^2 + W3*(\text{limit}_{illuminance}/(\text{illuminance}(Z,V) - \text{limit}_{illuminance}))^2$$

The variables $W1$, $W2$ and $W3$ represent weighting factors. $V$ is the optical imaging scale, $Z$ represents the digital zoom factor, with the product of imaging scale $V$ and the digital zoom factor $Z$ yielding the total imaging scale. The limits values of the resolution "$\text{limit}_{resolution}$" and of the depth of field range "$\text{limit}_{depth\ of\ field}$" are preferably adjusted manually by the observer. The limit value of the illuminance "$\text{limit}_{illuminance}$" depends on the object, in particular; by way of example, this limit value can be the maximum illuminance before radiation damage is caused in the object. The individual terms of the cost function can be linear or exponential. Setting the optical imaging scale $V$ and the digital zoom factor $Z$ is implemented by minimizing the cost function, wherein a preference for special parameters or characteristics can be obtained by the different weighting of the individual terms by changing the variables. Other cost functions are also conceivable; by way of example, these consider the working distance and/or the signal-to-noise ratio.

The above-described advantages, preferred embodiments and variants of the microscopy method find corresponding use for the microscope.

The aforementioned adjustment of the radiant field dimensions of an illumination device can also be used independently of other aspects of the microscope or of the microscope method and, in particular, can be used independently of the parameter adjustment or closed-loop control. Here, provision is made of a microscopy method for producing an electronic image of an object, wherein the object on an object field is imaged with an adjustable optical imaging scale into an image field on an image detector, wherein the optical imaging scale is chosen in such a way that the image field is smaller than a detector area of the image detector and wherein the electronic image is subjected to digital magnification or trimming such that the electronic image no longer contains any components which are contained in regions of the detector area not covered by the image field and wherein an illumination device is adjusted in such a way that only the portions within the object field contained in the electronic image are illuminated. This microscopy method can be combined with all aspects described herein in conjunction with the parameter adjustment or closed-loop control.

It is understood that the features specified above and the features yet to be explained below can be used not only in the specified combinations, but also in other combinations or on their own, without departing from the scope of the present invention.

BRIEF DESCRIPTION OF THE DRAWINGS

The invention will now be described with reference to the drawings wherein:

FIG. 2 shows a schematic illustration for illustrating a microscopy method carried out with the microscope; and, FIGS. 3A and 3B show block diagrams for illustrating the essential method steps of the method of FIG. 2.

DESCRIPTION OF THE PREFERRED EMBODIMENTS OF THE INVENTION

Figure 1:
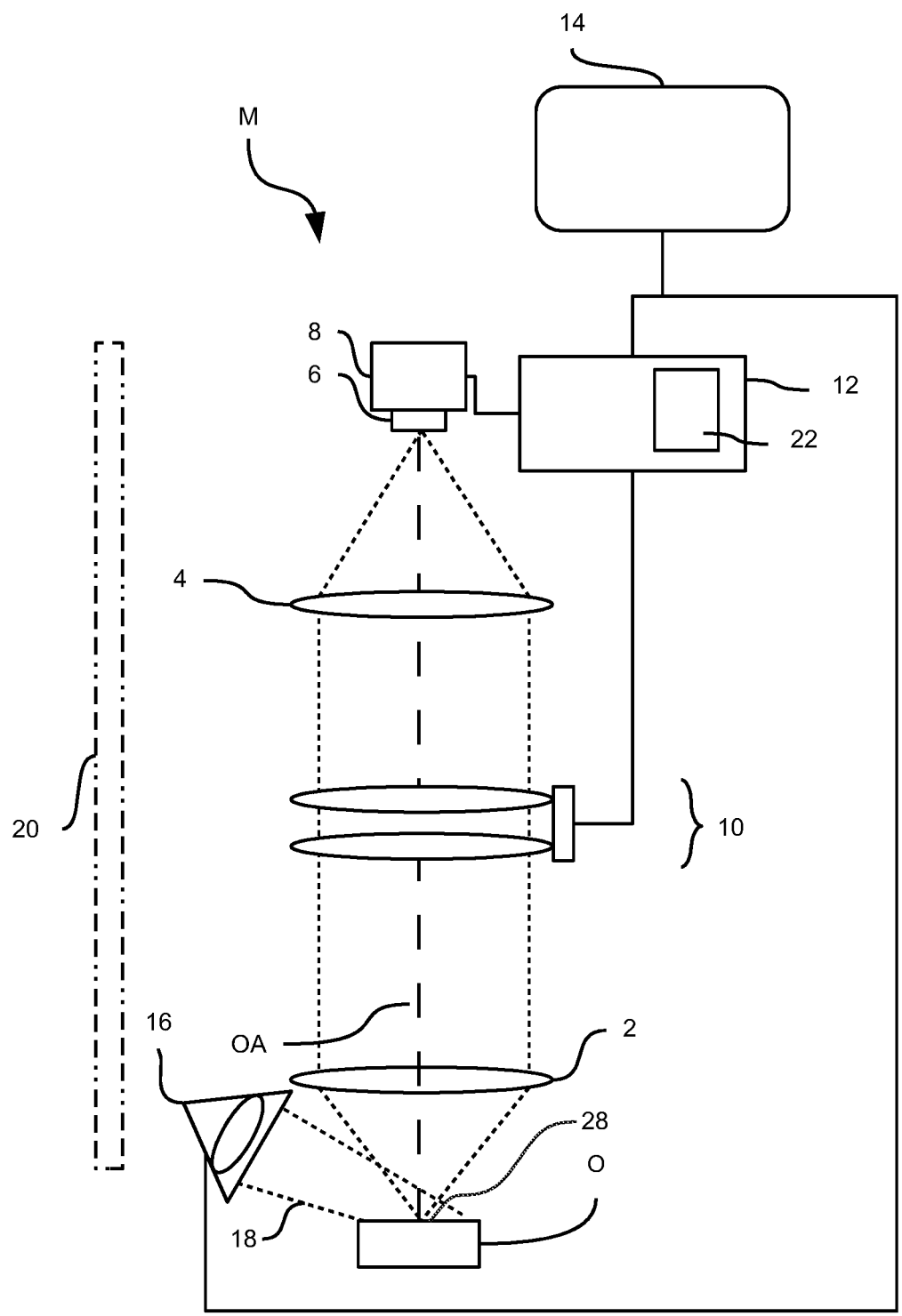
FIG. 1 shows a schematic illustration of an embodiment of a microscope.

FIG. 1 schematically shows a microscope M for imaging an object O. Preferably, the microscope M is a surgical microscope which images part of a patient during a surgical intervention. The microscope M images the object O from an object field on an image field, lying on a detector area 6 of an image detector 8, via an objective 2 and a tube lens 4. A zoom optical unit 10 is present in the beam path, the zoom optical unit altering the optical imaging scale, for example, the size of the image field in the case of an unchanging size of the object field, and including to this end a drive not denoted in any more detail. The optical imaging scale, with which the object field is imaged on the image field by the objective 2, the zoom optical unit 10 and the tube lens 4, is therefore adjustable. The image detector 8 is read by a controller 12, which converts the data obtained in this way into an electronic image, which is displayed on a display device 14.

The object O is illuminated by an illumination source 16, which emits the illumination radiation 18 toward the object O; the size of the illuminated spot is preferably adjustable, for example, by a radiant field stop (not illustrated).

The working distance between the microscope M and the objective O is adjustable in one embodiment. To this end, provision is made of an adjustment unit 20 (not illustrated) with corresponding support means, which adjust the microscope M including at least the objective 2, the zoom optical unit 10, the tube lens 4 and the image detector 8 together in relation to the object O. This has been disclosed for surgical microscopes from the prior art. Here, the object field dimension is then also adjusted unless the zoom optical unit 10 is embodied in such a way that it also allows an adjustment of the object field dimension. Such varifocal objectives are possible in embodiments.

The control device 12 is not only connected to the image detector 8 and the drive of the zoom optical unit 10 but optionally also to the illumination device 16 in embodiments with adjustable radiant field dimensions.

To present the electronic image on the display device 14, the control device 12 can not only adjust the imaging scale by way of the zoom optical unit 10 but can also adjust a digital magnification, implemented in the electronic image data from the image detector 8, before the electronic image is displayed on the display device 14. Preferably, the control device 12 can also adjust the exposure time and the resolution of the image detector 8, the latter by pixel binning, for example.

Further optionally, the control device 12 includes an input device 22, by means of which a user can adjust the mode of operation of the microscope M. A user, for example a surgeon, can specify or adjust the imaging scale of the microscope M using the control device 12.

Preferably, the microscope M is embodied as a stereo microscope, of the type as is known from DE 10 2018 110 643 B3. The content of this publication is incorporated herein by reference.

The functionality for improving a parameter of the image is explained below with reference to FIG. 2. The microscopy method carried out in the process brings about an adjustment/closed-loop control of the parameter by virtue of a desired total imaging scale initially being set on the control device 12. The latter is then divided between an optical imaging scale serving as manipulated variable by way of an appropriate adjustment of the zoom optical unit 10 and a digital magnification, brought about in the image data prior to the display on the display device 14, such that the parameter lies within a predetermined setpoint value range or misses the latter by no more than a tolerance. In the process, the parameter to be optimized can likewise be selected on the control device 12 or is fixedly specified in other embodiments, that is, already stored in the control device 12 and set thereby.

Here, the adjustment/closed-loop control is initially explained below in a very simple embodiment. The latter initially produces a preliminary image of the object, with the total imaging scale only being caused by the optical imaging scale, that is, the setting of the zoom optical unit 10. A digital magnification does not yet occur here. Subsequently, the optical imaging scale is reduced until the parameter reaches the desired setpoint value range (possibly with the tolerance being taken into account). Naturally, this occurs if the parameter in the preliminary region is not in the setpoint value range. If the parameter was placed into the desired setpoint value range in this way, the digital magnification ensures that the reduction of the optical imaging scale is compensated such that, total, the set total magnification entered at the control device 12, that is, the total imaging scale, is reached again.

Here, the reduction in the optical imaging scale can additionally or alternatively also be realized by an adjustment of the working distance if the corresponding device 20 to this end is present.

By way of example, the signal-to-noise ratio of the image can be improved as a parameter since the light intensity incident on the image detector 8 is increased by altering the optical imaging scale.

To elucidate this, the object O is represented as a flower in a schematic illustration in FIG. 2. The object O reflects or emits light, which is supplied by the optical units 2, 10, 4 to the image detector 8. To produce a preliminary image, illustrated in FIG. 2 as path A, the zoom optical unit 10 is adjusted in such a way that the object O is imaged on the detector area 72 of the image detector 8 with the total imaging scale set in advance. Here, the dimensions of the image field 71 fit to the detector area 72 (provided with reference sign 6 in FIG. 1).

Subsequently, a check is carried out as to whether the signal-to-noise ratio is within a specified setpoint value range. This can be implemented by way of a known noise analysis. The specified setpoint value range has a lower limit, which is adjustable by the user of the microscope M. By way of example, this lower limit can be chosen in such a way that the final image has a desired, acceptable signal-to-noise ratio. If the signal-to-noise ratio is not in the specified setpoint value range, the optical imaging scale of the zoom optical unit 10 is reduced until the signal-to-noise ratio lies in the specified setpoint value range. This is illustrated as path B in FIG. 2.

The reduction in the optical imaging scale causes the image field 71 to significantly underfill the detector area 72. On the other hand, all of the imaging radiation from the object field reaches the detector area 72. Since not all pixels of the detector area 72 are illuminated, the number of photons per illuminated pixel is increased in comparison with the preliminary image. Now, the final digital image is produced by virtue of a digital magnification being carried out by way of a digital zoom factor. In this way, only pixels with an improved signal-to-noise ratio contribute to the image (path A).

To ensure that the region of the object O visible in the preliminary image corresponds with the section of the object O visible in the final image, the final image is digitally post-magnified with the zoom factor which corresponds to the quotient of total imaging scale and reduced optical imaging scale. The digitally magnified image is presented to the observer. The signal-to-noise ratio has been improved in comparison with the preliminary image on account of the higher light intensity per pixel during the imaging with the reduced magnification scale.

In another embodiment, the method is used to improve the depth of field range of the image. Here, too, a check is carried out as to whether the depth of field range of the image lies within a specified setpoint value range. Should this not be the case, the optical imaging scale is reduced until the depth of field range lies in the specified setpoint value range and the final image is subsequently digitally magnified to the total imaging scale.

Figure 3A:
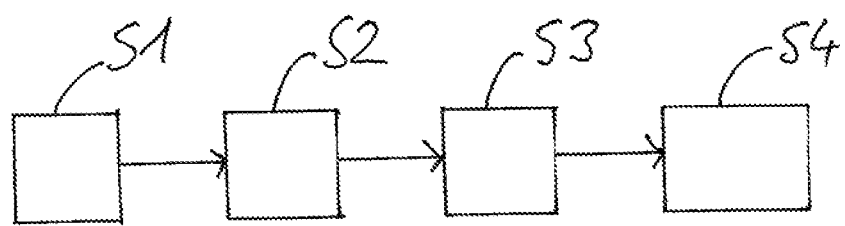
Figure 3B:
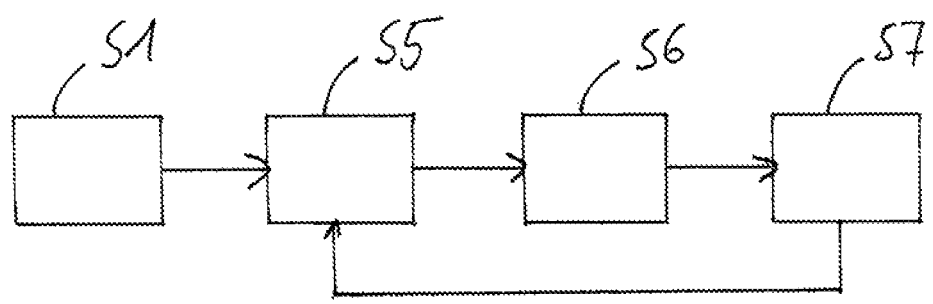

The principal procedure is explained again on the basis of FIGS. 3A and 3B, with the working distance optionally being altered in this case. With reference to FIG. 3A, in a first step S1, the position of the microscope M is adjusted in relation to the object O and hence the working distance is set. Further, a total imaging scale is set, for example by virtue of the user adjusting the optical imaging scale to the desired total imaging scale. In this way, the section of the object O visible in the image and the magnification thereof is set in step S1. Further, a preliminary image of the object O is produced.

In a subsequent step S2, at least one parameter of the image, such as the signal-to-noise ratio or the depth of field range, for example, is set.

In step S3, a check is carried out as to whether the parameter of the preliminary image lies within a specified setpoint value range or a setpoint value range likewise set in step S2. Should this not be the case, the optical imaging scale is reduced until the parameter lies within the specified setpoint value range. This can be implemented by altering the working distance and/or the zoom optical unit. Subsequently, the final image of the object O is produced by virtue of there being a digital magnification to the total magnification scale 5. The reduction of the optical imaging scale and compensating digital magnification are implemented until the parameter lies in the specified setpoint value range.

An optional condition for the reduction of the imaging scale is that the resolution of the digitally post-magnified final image reaches a specified minimum value of the resolution In a subsequent optional step S4, the illuminance of the illumination device 50 is reduced in this way until the signal-to-noise ratio reaches a threshold. In this way, the illuminance can be reduced without the signal-to-noise ratio falling below a specified limit value.

Further, the area 28 of the object O illuminated by the illumination device 16 can optionally be adapted to the digital zoom in such a way that the illuminated area 28 corresponds with the section displayed in the final image. Thus, only the region of the object O visible in the digitally post-magnified image is illuminated. This means that the optical image field images regions that are not illuminated in the object O. In this way, the radiation generated by the illumination device 16 can be concentrated on the relevant regions.

Another embodiment of the microscopy method, which is illustrated schematically in FIG. 3B, again starts with step S1, as explained above. Here, it is not only a simplified incremental procedure for adjustment/closed-loop control that is now pursued; instead, there is closed-loop control with a control loop to the effect of the value of the parameter being placed in the setpoint value range in a control loop, with the corresponding manipulated variable being the optical imaging scale, for example, the adjustment of the zoom optical unit 10. At the same time, a digital magnification ensures that the total imaging scale set is maintained. Ultimately, the closed-loop control therefore adjusts the ratio between optical imaging scale and digital magnification.

In step S5, the cost function KF presented below is minimized.

$$KF(Z,V)^2 = W1*((\text{resolution}(Z,V) - \text{limit}_{resolution})/\text{limit}_{resolution})^2 + W2*((\text{depth of field range}(Z,V) - \text{limit}_{depth\ of\ field\ range})/\text{limit}_{depth\ of\ field\ range})^2 + W3*(\text{limit}_{illuminance}/(\text{illuminance}(Z,V) - \text{limit}_{illuminance}))^2$$

The cost function KF depends on the resolution of the image, the illuminance and the depth of field range, with the weighting factors W1, W2 and W3 allowing individual terms to be preferred. V is the optical imaging scale; Z represents the digital zoom factor. The product of optical imaging scale V and the digital zoom factor Z yields the total magnification scale. The limit values of the resolution "limit$_{resolution}$" and of the depth of field range "limit$_{depth\ of\ field}$" are preferably adjusted manually by the observer. The limit value of the illuminance "limit$_{illuminance}$" is set on the basis of the object O, in particular; by way of example, this limit value can be the maximum illuminance before radiation damage is caused in the object O.

In steps S6 and S7, a control loop is carried out to minimize the characteristics ascertained in the cost function KF. In the process, a check is carried out in step S7 as to whether the parameters lie in the specified setpoint value range. If the parameters lie in the specified setpoint value range, the method ends in step S7. In one embodiment, the control device 12 contains a controller, for example a P-controller, a PI-controller or a PID-controller or a fuzzy controller.

It is understood that the foregoing description is that of the preferred embodiments of the invention and that various changes and modifications may be made thereto without departing from the spirit and scope of the invention as defined in the appended claims.

What is claimed is:

1. A microscopy method for producing an electronic image of an object, the method comprising:
    setting a total imaging scale for the electronic image;
    providing a cost function depending on at least two of: a signal-to-noise ratio, a depth of field range, working distance, an object illumination intensity, and an image resolution of the electronic image as parameters;
    illuminating and imaging the object with an optical imaging scale onto an electronic image detector providing electronic image data, wherein the optical imaging scale is adjusted in a closed-loop control to minimize the cost function in said closed-loop control;
    generating the electronic image by digital post magnification of the electronic image data to the total imaging scale; and,
    wherein the cost function is represented by an equation $$KF(Z,V)^2 = W1*((\text{resolution}(Z,V) - \text{limit}_{resolution})/\text{limit}_{resolution})^2 + W2*((\text{depth of field range}(Z,V) - \text{limit}_{depth\ of\ field\ range})/\text{limit}_{depth\ of\ field\ range})^2 + W3*(\text{limit}_{illuminance}/(\text{illuminance}(Z,V) - \text{limit}_{illuminance}))^2$$

wherein W1, W2, and W3 are weighting factors, V is the optical imaging scale, Z is the digital magnification, "limit$_{resolution}$" is a predetermined minimal resolution, "limit$_{depth\ of\ field\ range}$" is a predetermined depth of field range, and "limit$_{illuminance}$" is a predetermined maximum illuminance.

2. The microscopy method of claim 1, wherein the closed-loop control comprises:
    producing a preliminary electronic image of the object with the optical imaging scale realizing the total imaging scale;
    reducing the optical imaging scale until the value of the cost function lies within a specified setpoint value range with a tolerance; and,
    performing digital post magnification of the preliminary electronic image to generate the electronic image having the total imaging scale.

3. The microscopy method of claim 1, wherein the cost function is minimized such that an image resolution of the electronic image lies above a specified minimum value.

4. The microscopy method of claim 1, wherein additionally the working distance is adjusted in said closed-loop control.

5. The microscopy method of claim 1, wherein additionally the object illumination intensity is adjusted in said closed-loop control.

6. The microscopy method of claim 1, wherein the optical imaging scale is adjusted such that an image field completely covers a detector surface of the electronic image detector.

7. The microscopy method of claim 1, wherein the object is illuminated with illumination radiation in an illumination area, wherein the size of the illumination area is adjusted such that an extension of the illumination area corresponds to the region of the object visible in a final electronic image and regions of the object which are located in an optical object field but not visible in the electronic image are not illuminated.

8. The microscopy method of claim 1, wherein said closed-loop control is achieved via proportional closed-loop control, proportional-integral closed-loop control, proportional-integral-derivative closed-loop control, or fuzzy closed-loop control.

9. The microscopy method of claim 1, wherein an absolute optical imaging scale, a proportion of the optical imaging scale in the total imaging scale or a ratio of optical imaging scale to digital post magnification is adjusted in the control.

10. A microscope for producing an electronic image of an object, the microscope comprising:
an image detector configured to generate electronic image data;
an objective lens, a tube lens and an adjustable optical zoom lens configured to conjointly produce an optical image on said image detector with an adjustable optical imaging scale;
a control device including a processor and being configured to produce an electronic image of the object from the electronic image data and to adjust the adjustable optical imaging scale;
said control device being further configured to:
set a total imaging scale for the electronic image;
provide a cost function depending on at least two of: a signal-to-noise ratio, a depth of field range, a working distance, an object illumination intensity and an image resolution as a parameter;
illuminate and image the object with an optical imaging scale onto the electronic image detector and adjust the optical imaging scale in a closed-loop control to minimize the cost function in said closed-loop control;
generate the electronic image by digital post magnification of the electronic image data to the total imaging scale; and,
wherein the control device is further configured such that the cost function is represented by the following equation $$KF(Z,V)^2 = W1*((resolution(Z,V) - limit_{resolution})/limit_{resolution})^2 + W2*((depth\ of\ field\ range(Z,V) - limit_{depth\ of\ field\ range})/limit_{depth\ of\ field\ range})^2 + W3*(limit_{illuminance}/(illuminance(Z,V) - limit_{illuminance}))^2$$

wherein W1, W2, and W3 are weighting factors, V is the optical imaging scale, Z is the digital magnification, "$limit_{resolution}$" is a predetermined limit resolution, "$limit_{depth\ of\ field\ range}$" is a predetermined depth of field range, and "$limit_{illuminance}$" is a predetermined maximum illuminance.

11. The microscope of claim 10, wherein said control device is further configured to:
produce a preliminary electronic image of the object with the optical imaging scale realizing the total imaging scale;
reduce the optical imaging scale until the cost function lies within a specified setpoint value range with a tolerance; and,
perform digital post magnification of the preliminary electronic image to generate a final electronic image having the total imaging scale.

12. The microscope of claim 10, wherein said control device is further configured to adjust the working distance in the closed-loop control.

13. The microscope of claim 10, wherein said control device is further configured to adjust the object illumination intensity in the closed-loop control.

14. The microscope of claim 10, wherein said image detector defines a detector surface; said control device is further configured to adjust the optical imaging scale such that an image field completely covers said detector surface of said electronic image detector.

15. The microscope of claim 10, wherein said control device is further configured to control the microscope such that the object is illuminated with illumination radiation in an illumination area defining a size, wherein the size of the illumination area is adjusted such that an extension of the illumination area corresponds to a region of the object visible in a final electronic image and regions of the object which are located in an optical object field but not visible in the final electronic image are not illuminated.

16. The microscope of claim 10, wherein the control device is further configured to implement proportional closed-loop control, proportional-integral closed-loop control, proportional-integral-derivative closed-loop control or fuzzy closed-loop control.

17. The microscope of claim 10, wherein said control device is further configured to additionally adjust one of the following in the closed-loop control: an absolute optical imaging scale, a proportion of the optical imaging scale in the total imaging scale or a ratio of optical imaging scale to digital magnification.

18. A microscopy method for producing an electronic image of an object, the method comprising:
setting a total imaging scale for the electronic image;
providing a specified parameter for the electronic image, wherein the specified parameter includes at least one of the following: a signal-to-noise ratio in the electronic image, a depth of field range, a working distance being a distance between the microscope and the object, and an object illumination intensity;
specifying a setpoint value range for the specified parameter;
illuminating and imaging the object with an adjustable optical imaging scale onto an electronic image detector providing electronic image data while open-loop or closed-loop controlling the specified parameter to have a value in the specified setpoint value range with a tolerance, wherein at least the adjustable optical imaging scale forms a basis for a manipulated variable of said open-loop or closed-loop controlling;
generating the electronic image by performing digital image magnification on the electronic image data to the total imaging scale;
wherein a cost function is evaluated and minimized in said open-loop or closed-loop controlling by adjusting said adjustable optical imaging scale and digital magnification, the cost function linking several of the signal-to-noise ratio, the depth of field range, the working distance, the object illumination intensity and resolution;

wherein the cost function is represented by an equation $$KF(Z,V)^2 = W1*((\text{resolution}(Z,V) - \text{limit}_{resolution})/\text{limit}_{resolution})^2 + W2*((\text{depth of field range}(Z,V) - \text{limit}_{depth\ of\ field\ range})/\text{limit}_{depth\ of\ field\ range})^2 + W3*(\text{limit}_{illuminance}/(\text{illuminance}(Z,V) - \text{limit}_{illuminance}))^2$$

wherein W1, W2, and W3 are weighting factors, V is the optical imaging scale, Z is the digital magnification, "limit$_{resolution}$" is a predetermined limit resolution, "limit$_{depth\ of\ field\ range}$" is a predetermined depth of field range, and "limit$_{illuminance}$" is a predetermined maximum illuminance.

* * * * *